United States Patent
Foglio, Sr.

(10) Patent No.: US 6,526,699 B1
(45) Date of Patent: Mar. 4, 2003

(54) WATER HOLDING AND DISPERSING APPARATUS

(76) Inventor: Steve J. Foglio, Sr., 621 Beverly Dr., Magnolia, NJ (US) 08049

( * ) Notice: Subject to any disclaimer, the term of this patent is extended or adjusted under 35 U.S.C. 154(b) by 0 days.

(21) Appl. No.: 09/827,776

(22) Filed: Apr. 6, 2001

(51) Int. Cl.⁷ .............................................. E04D 13/00
(52) U.S. Cl. ..................... 52/15; 52/16; 52/11; 52/58; 52/302.6; 137/357; 137/373; 137/343; 137/587; 137/360; 239/208; 220/646; 220/650; 220/671; 220/567
(58) Field of Search ................................. 52/16, 15, 11, 52/58, 302.6; 137/357, 373, 376, 343, 587, 360, 861; 239/208; 220/646, 650, 671, 567

(56) References Cited

U.S. PATENT DOCUMENTS

| | | | |
|---|---|---|---|
| 1,176,536 A | * | 3/1916 | Fulton ..................... 137/590.5 |
| 4,386,484 A | | 6/1983 | Van Berne et al. |
| 4,726,151 A | | 2/1988 | Vitale |
| 4,934,404 A | | 6/1990 | Destefano |
| 5,046,529 A | * | 9/1991 | Corella ..................... 137/590.5 |
| 5,718,269 A | * | 2/1998 | McGarvey ................... 141/198 |
| 5,730,179 A | | 3/1998 | Taylor |
| 5,863,151 A | | 1/1999 | Chapotelle |
| D415,553 S | | 10/1999 | Wolfe |
| 6,357,183 B1 | * | 3/2002 | Smith ............................ 52/15 |
| 6,378,546 B1 | * | 4/2002 | Hansen ....................... 137/208 |

* cited by examiner

Primary Examiner—Lanna Mai
Assistant Examiner—Chi Nguyen

(57) ABSTRACT

A water holding and dispersing apparatus for catching and retaining rainwater for later watering usage. The water holding and dispersing apparatus includes a housing having a top wall, a bottom wall, a front wall, a back wall, a first side wall and a second side wall. The housing comprises a substantially rigid material. A supply pipe is positioned nearer the top wall than the bottom wall and has a first end fluidly coupled to the housing. A second end of the supply pipe is fluidly coupled to a gutter of a dwelling such that water in the gutter will flow into the housing through the supply pipe. A first drainage pipe is fluidly coupled to the first side wall and is located generally adjacent to the bottom wall. The first drainage pipe has a valve thereon for selectively opening and closing the first drainage pipe.

13 Claims, 2 Drawing Sheets

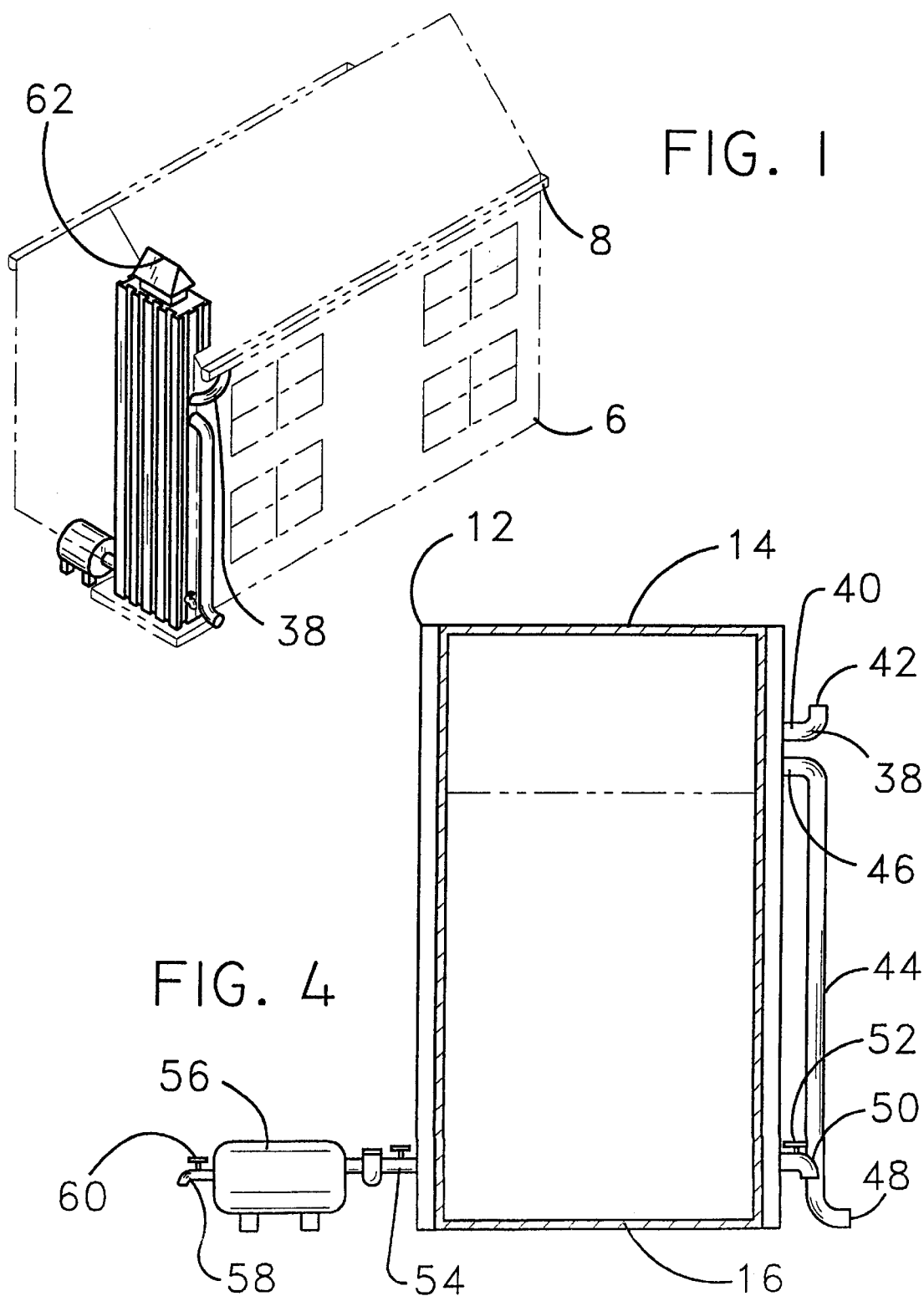

WATER HOLDING AND DISPERSING APPARATUS

BACKGROUND OF THE INVENTION

1. Field of the Invention

The present invention relates to water holding systems and more particularly pertains to a new water holding and dispersing apparatus for catching and retaining rainwater for later watering usage.

2. Description of the Prior Art

The use of water holding systems is known in the prior art. More specifically, water holding systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,726,151; 5,730,179; 5,863,151; 4,934,404; 4,386,484; and U.S. Pat. No. 415,553.

While these devices fulfill their respective, particular objectives and requirements, the aforementioned patents do not disclose a new water holding and dispersing apparatus. The inventive device includes a housing having a top wall, a bottom wall, a front wall, a back wall, a first side wall and a second side wall. The housing comprises a substantially rigid material. A supply pipe is positioned nearer the top wall than the bottom wall and has a first end fluidly coupled to the housing. A second end of the supply pipe is fluidly coupled to a gutter of a dwelling such that water in the gutter will flow into the housing through the supply pipe. A first drainage pipe is fluidly coupled to the first side wall and is located generally adjacent to the bottom wall. The first drainage pipe has a valve thereon for selectively opening and closing the first drainage pipe.

In these respects, the water holding and dispersing apparatus according to the present invention substantially departs from the conventional concepts and designs of the prior art, and in so doing provides an apparatus primarily developed for the purpose of catching and retaining rainwater for later watering usage.

SUMMARY OF THE INVENTION

In view of the foregoing disadvantages inherent in the known types of water holding systems now present in the prior art, the present invention provides a new water holding and dispersing apparatus construction wherein the same can be utilized for catching and retaining rainwater for later watering usage.

The general purpose of the present invention, which will be described subsequently in greater detail, is to provide a new water holding and dispersing apparatus apparatus and method which has many of the advantages of the water holding systems mentioned heretofore and many novel features that result in a new water holding and dispersing apparatus which is not anticipated, rendered obvious, suggested, or even implied by any of the prior art water holding systems, either alone or in any combination thereof.

To attain this, the present invention generally comprises a housing having a top wall, a bottom wall, a front wall, a back wall, a first side wall and a second side wall. The housing comprises a substantially rigid material. A supply pipe is positioned nearer the top wall than the bottom wall and has a first end fluidly coupled to the housing. A second end of the supply pipe is fluidly coupled to a gutter of a dwelling such that water in the gutter will flow into the housing through the supply pipe. A first drainage pipe is fluidly coupled to the first side wall and is located generally adjacent to the bottom wall. The first drainage pipe has a valve thereon for selectively opening and closing the first drainage pipe.

There has thus been outlined. rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water holding and dispersing apparatus apparatus and method which has many of the advantages of the water holding systems mentioned heretofore and many novel features that result in a new water holding and dispersing apparatus which is not anticipated, rendered obvious, suggested, or even implied by any of the prior art water holding systems, either alone or in any combination thereof.

It is another object of the present invention to provide a new water holding and dispersing apparatus which may be easily and efficiently manufactured and marketed.

It is a further object of the present invention to provide a new water holding and dispersing apparatus which is of a durable and reliable construction.

An even further object of the present invention is to provide a new water holding and dispersing apparatus which is susceptible of a low cost of manufacture with regard to both materials and labor, and which accordingly is then susceptible of low prices of sale to the consuming public, thereby making such water holding and dispersing apparatus economically available to the buying public.

Still yet another object of the present invention is to provide a new water holding and dispersing apparatus which provides in the apparatuses and methods of the prior art some of the advantages thereof, while simultaneously overcoming some of the disadvantages normally associated therewith.

Still another object of the present invention is to provide a new water holding and dispersing apparatus for catching and retaining rainwater for later watering usage.

Yet another object of the present invention is to provide a new water holding and dispersing apparatus which includes a housing having a top wall, a bottom wall, a front wall, a back wall, a first side wall and a second side wall. The housing comprises a substantially rigid material. A supply pipe is positioned nearer the top wall than the bottom wall and has a first end fluidly coupled to the housing. A second end of the supply pipe is fluidly coupled to a gutter of a dwelling such that water in the gutter will flow into the housing through the supply pipe. A first drainage pipe is fluidly coupled to the first side wall and is located generally adjacent to the bottom wall. The first drainage pipe has a valve thereon for selectively opening and closing the first drainage pipe.

Still yet another object of the present invention is to provide a new water holding and dispersing apparatus that will hold water retained during a rainstorm for later use during a drought.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new water holding and dispersing apparatus according to the present invention.

FIG. 4 is a schematic side-cross sectional view taken along line 4—4 in FIG. 3 of the present invention.

DESCRIPTION OF THE PREFERRED EMBODIMENT

Figure 3:
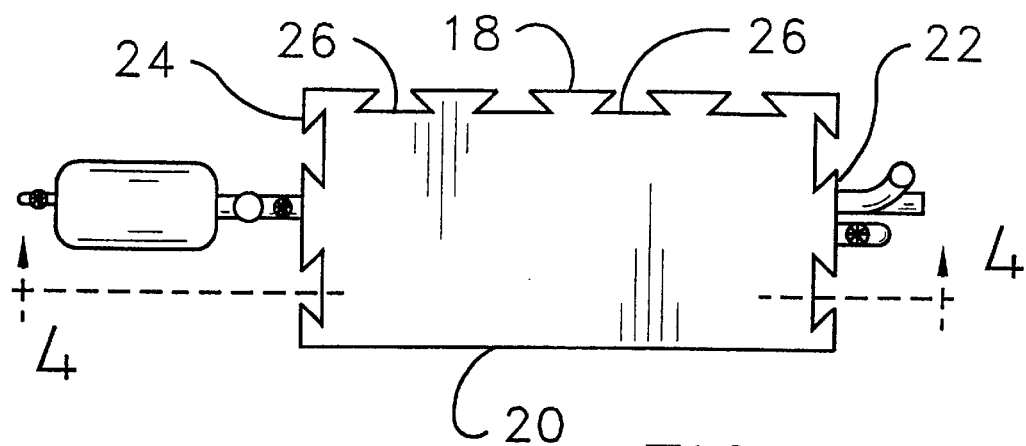
FIG. 3 is a schematic top view of the present invention.
Figure 2:
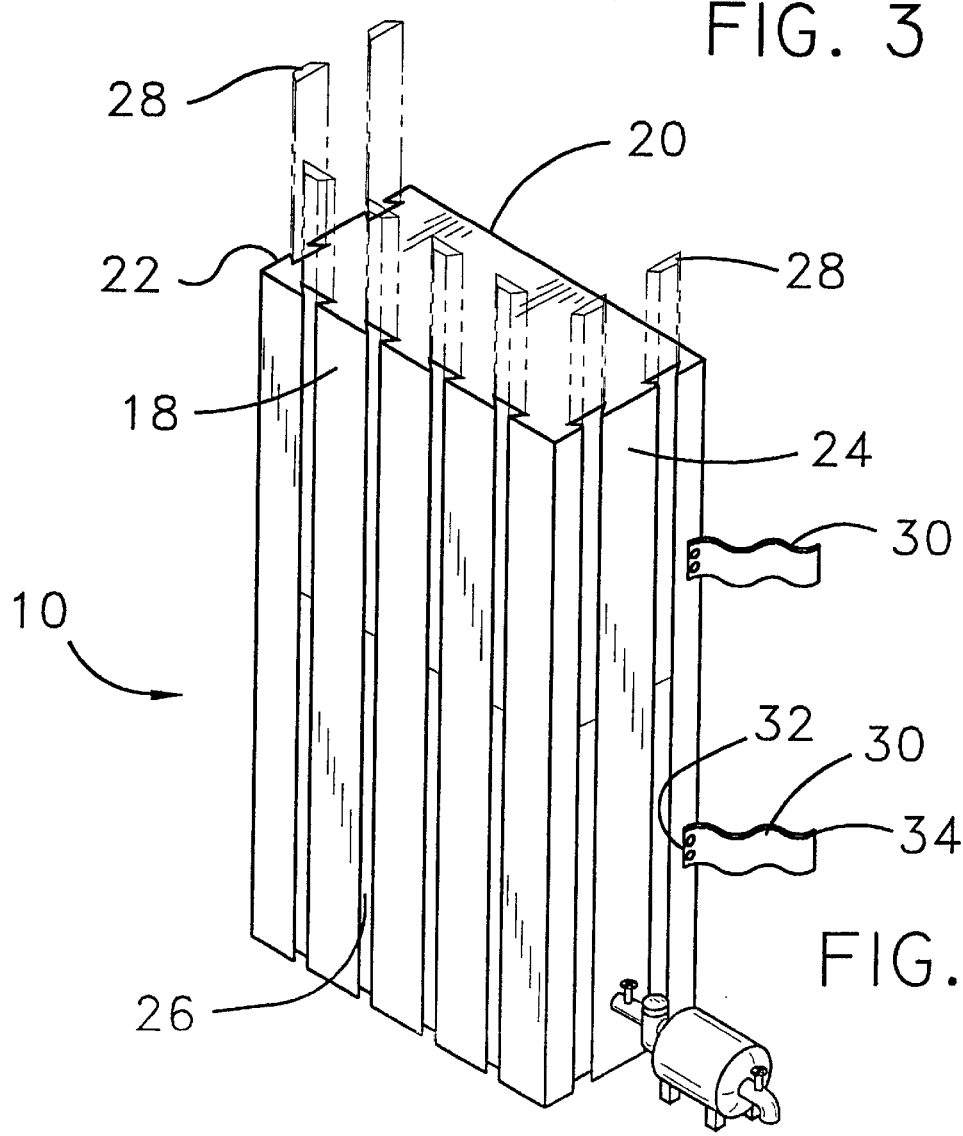
FIG. 2 is a schematic perspective view of the present invention.

With reference now to the drawings, and in particular to FIGS. 1 through 4 thereof, a new water holding and dispersing apparatus embodying the principles and concepts of the present invention and generally designated by the reference numeral 10 will be described.

As best illustrated in FIGS. 1 through 4, the water holding and dispersing apparatus 10 generally comprises a rainwater collection and dispensing device positionable adjacent to a dwelling 6 and fluidly coupled to a gutter 8 attached to a roof. The device 10 comprises a housing 12 having a top wall 14, a bottom wall 16, a front wall 18, a back wall 20, a first side wall 22 and a second side wall 24. The housing 12 comprises a substantially rigid plastic material. The front wall 18 has a width generally between 3 feet and 5 feet. The first side wall 22 has a width generally between 2 feet and 3 feet. Each of the front 18 and side walls 22, 24 has a plurality of channels 26 therein extending from the top wall to the bottom wall. Each of the channels 26 widen as they extend inward such that each of the channels 26 has a generally trapezoidal shaped cross-section taken transverse to a longitudinal axis of the channels 26. A plurality of elongated members 28 has the same shape of the channels and each is extendably positionable in one of the channels 26. The elongated members 28 preferably comprise a wood material and remain in the channels 26 due to their shape. Siding or bricks may be attached to the elongated members 28 such that the device resembles a chimney. The elongated members 28 prevent risk of puncturing the device 10 by attaching the siding directly to the housing.

A plurality of straps 30 has a first end 32 attached to one of the first 22 and second 24 side walls. Each of the straps having a second end 34 removably attachable to the dwelling 6 by conventional mechanical fasteners for holding the device 10 in an upright position.

A supply pipe 38 is positioned nearer the top wall 14 than the bottom wall 16 and has a first end 40 fluidly coupled to the housing 12. A second end 42 of the supply pipe 38 is fluidly coupled to the gutter 8 such that water in the gutter 8 will flow into the housing 12 through the supply pipe 38.

An overflow pipe 44 has a first end 46 fluidly coupled to the housing 12 and positioned generally adjacent to the supply pipe 38 such that the overflow pipe 44 is positioned between the supply pipe 38 and the bottom wall 16. A second end 48 of the supply pipe 38 is positioned generally adjacent to the bottom wall 16.

A first drainage pipe 50 is fluidly coupled to the first side wall 22 and is located generally adjacent to the bottom wall 16. The first drainage pipe 50 has a valve 52 thereon for selectively opening and closing the first drainage pipe 50.

A second drainage pipe 54 is fluidly coupled to the second side wall 24 and is located generally adjacent to the bottom wall 16.

A water pump 56 for increasing water pressure flowing from the second drainage pipe 54 is fluidly coupled to the second drainage pipe 54, or alternatively may be attached to the first drainage pipe 50 if there is no second drainage pipe.

An outlet pipe 58 is fluidly coupled to the water pump 56 and has a valve 60 thereon for selectively opening and closing the outlet pipe 58. The outlet pipe 58 and the drainage pipes 54, 50 are preferably threaded for threadably coupling to a hose.

In use, the device 10 collects rainwater from the gutter 8 and stores it for later use on lawns or gardens. The pump 56 is a conventional pump used to add pressure to the water for using it through a sprinkler or moving the water along an upgrade. The drainage pipe 44 prevents the water from rising to a level which would cover the first end 40 of the supply pipe 38. A cap member 62 is preferably attached to the top wall 14 to further make the device resemble a conventional chimney.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rainwater collection and dispensing device, said device being positionable adjacent to a dwelling and fluidly coupled to a gutter attached to a roof, said device comprising:
   a housing having a top wall, a bottom wall, a front wall, a back wall, a first side wall and a second side wall, said housing comprising a substantially rigid material;
   a supply pipe being positioned nearer said top wall than said bottom wall and having a first end fluidly coupled to said housing, a second end of said supply pipe being fluidly coupled to said gutter such that water in said gutter will flow into said housing through said supply pipe;
   a first drainage pipe being fluidly coupled to said first side wall and being located generally adjacent to said bottom wall, said first drainage pipe having a valve thereon for selectively opening and closing said first drainage pipe;
   each of said front and side walls having a plurality of channels therein extending from said top wall to said bottom wall, each of said channels widening as they extend inward such that each of said channels has a generally trapezoidal shaped cross-section taken transverse to a longitudinal axis of said channels;
   a plurality of elongated members having the same shape of said channels, each of said elongated members being extendably positionable in one of said channels; and
   covering coupled to said elongated members such that said covering is coupled to said housing, said covering being coupled to said elongated members to facilitate covering of said housing and minimize potential for puncturing said housing when coupling said covering to said housing.

2. The rainwater collection and dispensing device as in claim 1, wherein said front wall has a width generally between 3 feet and 5 feet, said first side wall having a width generally between 2 feet and 3 feet.

3. The rainwater collection and dispensing device as in claim 1, further including:
   a plurality of straps having a first end attached to one of said first and second side walls, each of the straps having a second end removably attachable to said dwelling.

4. The rainwater collection and dispensing device as in claim 1, further including:
   an overflow pipe having a first end fluidly coupled to said housing and positioned generally adjacent to said supply pipe such that said overflow pipe is positioned between said supply pipe and said bottom wall, said second end of said supply pipe being positioned generally adjacent to said bottom wall.

5. The rainwater collection and dispensing device as in claim 1, further including:
   a second drainage pipe being fluidly coupled to said second side wall and being located generally adjacent to said bottom wall;
   a water pump for increasing water pressure flowing from said second drainage pipe being fluidly coupled to said second drainage pipe; and
   an outlet pipe being fluidly coupled to said water pump and having a valve thereon for selectively opening and closing said outlet pipe.

6. The rainwater collection and dispensing device as in claim 1, further including:
   a water pump for increasing water pressure flowing from said first drainage pipe being fluidly coupled to said first drainage pipe; and
   an outlet pipe being fluidly coupled to said water pump and having a valve thereon for selectively opening and closing said outlet pipe.

7. A rainwater collection and dispensing device, said device being positionable adjacent to a dwelling and fluidly coupled to a gutter attached to a roof, said device comprising:
   a housing having a top wall, a bottom wall, a front wall, a back wall, a first side wall and a second side wall, said housing comprising a substantially rigid plastic material, said front wall having a width generally between 3 feet and 5 feet, said first side wall having a width generally between 2 feet and 3 feet, each of said front and side walls having a plurality of channels therein extending from said top wall to said bottom wall, each of said channels widening as they extend inward such that each of said channels has a generally trapezoidal shaped cross-section taken transverse to a longitudinal axis of said channels, a plurality of elongated members having the same shape of said channels and each being extendably positionable in one of said channels;
   covering coupled to said elongated members such that said covering is coupled to said housing, said covering being coupled to said elongated members to facilitate covering of said housing and minimize potential for puncturing said housing when coupling said covering to said housing;
   a plurality of straps having a first end attached to one of said first and second side walls, each of said straps having a second end being removably attachable to said dwelling;
   a supply pipe being positioned nearer said top wall than said bottom wall and having a first end fluidly coupled to said housing, a second end of said supply pipe being fluidly coupled to said gutter such that water in said gutter will flow into said housing through said supply pipe;
   an overflow pipe having a first end fluidly coupled to said housing and positioned generally adjacent to said supply pipe such that said overflow pipe is positioned between said supply pipe and said bottom wall, said second end of said supply pipe being positioned generally adjacent to said bottom wall;
   a first drainage pipe being fluidly coupled to said first side wall and being located generally adjacent to said bottom wall, said first drainage pipe having a valve thereon for selectively opening and closing said first drainage pipe;
   a second drainage pipe being fluidly coupled to said second side wall and being located generally adjacent to said bottom wall;
   a water pump for increasing water pressure flowing from said second drainage pipe being fluidly coupled to said second drainage pipe; and
   an outlet pipe being fluidly coupled to said water pump and having a valve thereon for selectively opening and closing said outlet pipe.

8. A rainwater collection and dispensing device, said device being positionable adjacent to a dwelling and fluidly coupled to a gutter attached to a roof, said device comprising:

a housing having a top wall, a bottom wall, a front wall, a back wall, a first side wall and a second side wall, said housing comprising a substantially rigid material;

a supply pipe being positioned nearer said top wall than said bottom wall and having a first end fluidly coupled to said housing, a second end of said supply pipe being fluidly coupled to said gutter such that water in said gutter will flow into said housing through said supply pipe;

a first drainage pipe being fluidly coupled to said first side wall and being located generally adjacent to said bottom wall, said first drainage pipe having a valve thereon for selectively opening and closing said first drainage pipe;

each of said front and side walls having a plurality of channels therein extending from said top wall to said bottom wall, each of said channels widening as they extend inward such that each of said channels has a generally trapezoidal shaped cross-section taken transverse to a longitudinal axis of said channels;

a plurality of elongated members having the same shape of said channels, each of said elongated members being extendably positionable in one of said channels; and covering coupled to said elongated members such that said covering is coupled to said housing, said covering being coupled to said elongated members to facilitate covering of said housing and minimize potential for puncturing said housing when coupling said covering to said housing.

9. The rainwater collection and dispensing device as in claim 8, wherein said front wall has a width generally between 3 feet and 5 feet, said first side wall having a width generally between 2 feet and 3 feet.

10. The rainwater collection and dispensing device as in claim 8, further including:

a plurality of straps having a first end attached to one of said first and second side walls, each of the straps having a second end removably attachable to said dwelling.

11. The rainwater collection and dispensing device as in claim 8, further including:

an overflow pipe having a first end fluidly coupled to said housing and positioned generally adjacent to said supply pipe such that said overflow pipe is positioned between said supply pipe and said bottom wall, said second end of said supply pipe being positioned generally adjacent to said bottom wall.

12. The rainwater collection and dispensing device as in claim 8, further including:

a second drainage pipe being fluidly coupled to said second side wall and being located generally adjacent to said bottom wall;

a water pump for increasing water pressure flowing from said second drainage pipe being fluidly coupled to said second drainage pipe; and an outlet pipe being fluidly coupled to said water pump and having a valve thereon for selectively opening and closing said outlet pipe.

13. The rainwater collection and dispensing device as in claim 8, further including:

a water pump for increasing water pressure flowing from said first drainage pipe being fluidly coupled to said first drainage pipe; and an outlet pipe being fluidly coupled to said water pump and having a valve thereon for selectively opening and closing said outlet pipe.

* * * * *